United States Patent
Hwang et al.

(10) Patent No.: US 8,295,841 B2
(45) Date of Patent: Oct. 23, 2012

(54) INTER-CARRIER MEMBER HANDOVER APPARATUS AND METHOD

(75) Inventors: You-sun Hwang, Seoul (KR); Soon-yong Lim, Daejeon-si (KR); Ae-soon Park, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 195 days.

(21) Appl. No.: 12/562,629

(22) Filed: Sep. 18, 2009

(65) Prior Publication Data

US 2010/0120431 A1 May 13, 2010

(30) Foreign Application Priority Data

Nov. 12, 2008 (KR) .................. 10-2008-0112130

(51) Int. Cl.
*H04W 36/00* (2009.01)
(52) U.S. Cl. ......... 455/436; 455/439; 455/442; 370/331
(58) Field of Classification Search .......... 455/436–444, 455/450–455, 509–516; 370/331–334
See application file for complete search history.

(56) References Cited

U.S. PATENT DOCUMENTS

| 2003/0002525 | A1* | 1/2003 | Grilli et al. | 370/465 |
| 2009/0156211 | A1* | 6/2009 | Hande et al. | 455/436 |
| 2011/0081856 | A1* | 4/2011 | Johansson et al. | 455/7 |

FOREIGN PATENT DOCUMENTS

| KR | 1020060059377 | 6/2006 |
| KR | 1020070025964 | 3/2007 |
| KR | 1020080063844 | 7/2008 |

* cited by examiner

*Primary Examiner* — Ajit Patel
*Assistant Examiner* — Erica Navar
(74) *Attorney, Agent, or Firm* — Nelson Mullins Riley & Scarborough LLP; EuiHoon Lee, Esq.

(57) ABSTRACT

Provided are an inter-carrier member handover apparatus and method. In the inter-carrier member handover apparatus and method, data is transmitted or received by allocating a plurality of carriers to a single mobile terminal, a carrier aggregation, which includes a plurality of carrier members that process the allocated carriers, is managed, and a handover between the carrier members in the managed carrier aggregation is processed when the handover is required. Therefore, an intra-base station handover can be performed when a mobile terminal and a base station exchange data using a plurality of carrier frequency bands.

8 Claims, 6 Drawing Sheets

INTER-CARRIER MEMBER HANDOVER APPARATUS AND METHOD

CROSS-REFERENCE TO RELATED APPLICATION

This application claims the benefit under 35 U.S.C. §119(a) of Korean Patent Application No. 10-2008-0112130, filed on Nov. 12, 2008, the disclosure of which is incorporated by reference in its entirety for all purposes.

BACKGROUND

1. Field

The following description relates to an inter-carrier member handover apparatus and method, and more particularly, a technology involving handover between carrier frequency bands within the same base station.

2. Description of the Related Art

Conventional inter-base station handover technologies involve the disconnecting of a mobile terminal from a source base station and then connecting the mobile terminal to a target base station according to changes in signal strength with respect to the movement of the mobile terminal. That is, it is handover technology for one carrier frequency band.

However, a plurality of carrier frequency bands, instead of only one carrier frequency band, may be allocated for data exchange between a mobile terminal and a base station, and the mobile terminal and the base station may exchange data using selected ones of the allocated carrier frequency bands. In this case, an intra-base station handover is required.

Therefore, the present inventor has developed an intra-base station handover technology that can be used when a mobile terminal and a base station exchange data using a plurality of carrier frequency bands.

SUMMARY

The following description relates to an inter-carrier member handover apparatus and method which can be used to perform an intra-base station handover when a mobile terminal and a base station exchange data using a plurality of carrier frequency bands.

According to an exemplary aspect, data is transmitted or received by allocating a plurality of carriers to a single mobile terminal, a carrier aggregation, which includes a plurality of carrier members that process the allocated carriers, is managed, and a handover between the carrier members in the managed carrier aggregation is processed when the handover is required.

Therefore, an intra-base station handover, which is simpler than a conventional inter-base station handover, may be performed when a mobile terminal and a base station exchange data using a plurality of carrier frequency bands.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain aspects of the invention.

DETAILED DESCRIPTION

The invention is described more fully hereinafter with reference to the accompanying drawings, in which exemplary embodiments of the invention are shown. Descriptions of well-known functions and constructions are omitted to increase clarity and conciseness.

Terms used throughout the specification will first be defined. The terms used in the following description are terms defined taking into consideration the functions obtained in accordance with the present invention, and may be changed in accordance with the option of a user or operator or a usual practice. Therefore, the definitions of these terms should be determined based on the entire content of this specification.

A carrier aggregation is a group of carrier members that process a plurality of carriers allocated for data exchange between a mobile terminal and a base station.

A source carrier member is one of carrier members in a carrier aggregation which is currently connected to a mobile terminal but is to be handed over to a target carrier member due to its poor radio environment.

A target carrier member is one of carrier members in a carrier aggregation which is not connected to a mobile terminal but is connected to the mobile terminal after a handover, due to its good radio environment.

An active carrier member is one of carrier members in a carrier aggregation which is currently connected to a mobile terminal but does not need to be handed over to a target carrier member due to its good radio environment.

Figure 1:
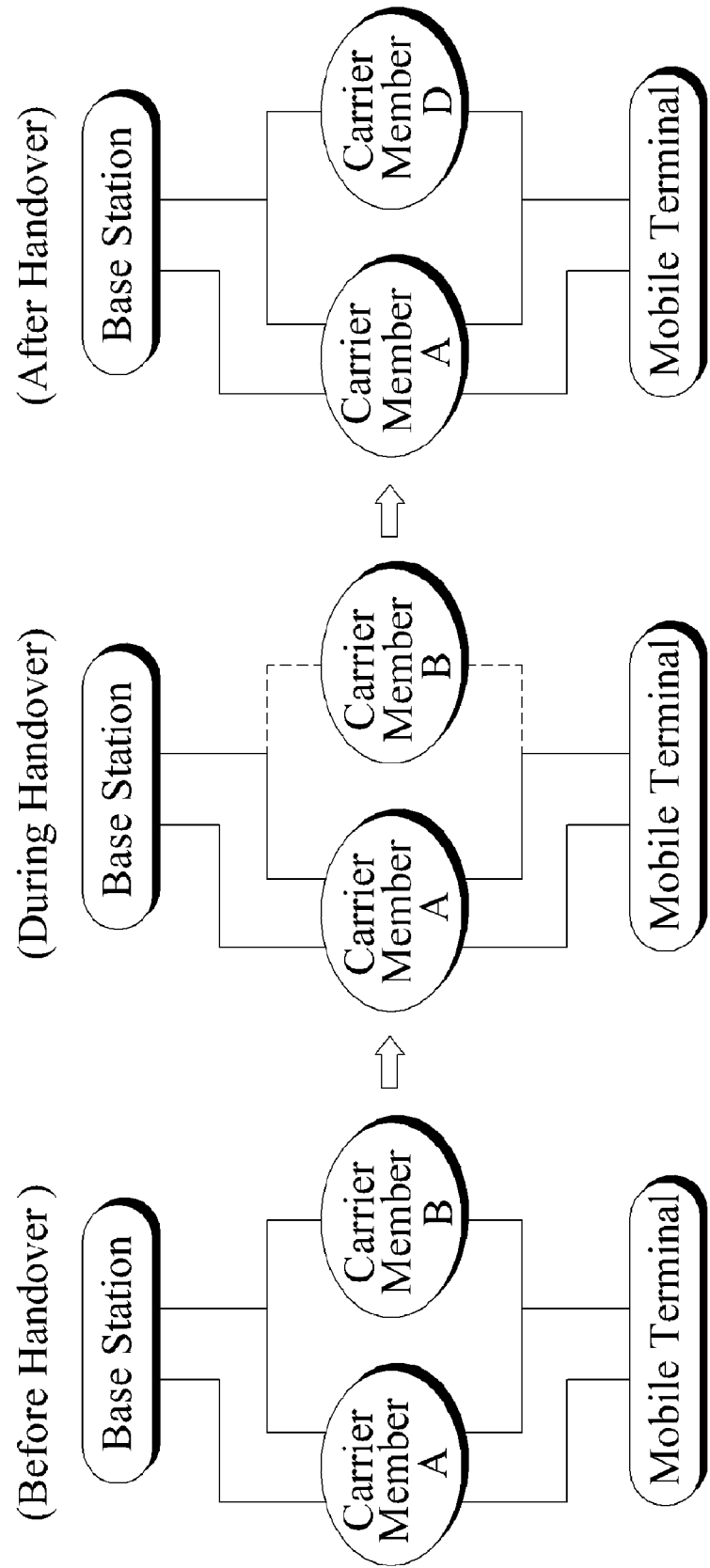
FIG. 1 is a conceptual diagram outlining the present invention.

FIG. 1 is a conceptual diagram outlining the present invention. If a plurality of carriers "a" through "d" are allocated for data exchange between a mobile terminal and a base station, a carrier aggregation may include carrier members A through D which process the carriers "a" through "d", respectively.

Referring to FIG. 1, before a handover, the mobile terminal and the base station may exchange data using the carrier members A and B, and one of data paths used by the mobile terminal may utilize only the carrier member A while the other data path utilizes the carrier members A and B simultaneously.

In this state, if the base station decides to hand over the carrier member B to the carrier member D due to the poor radio environment of the carrier member B, it transfers a data path, which passes through the carrier member B, to the carrier member A, so that data can be continuously exchanged between the base station and the mobile terminal during the handover. After the intra-base station handover, that is, after the carrier member B has been handed over to the carrier member D, the base station retransfers the data path, which was transferred to the carrier member A, to the carrier member D.

Figure 2:
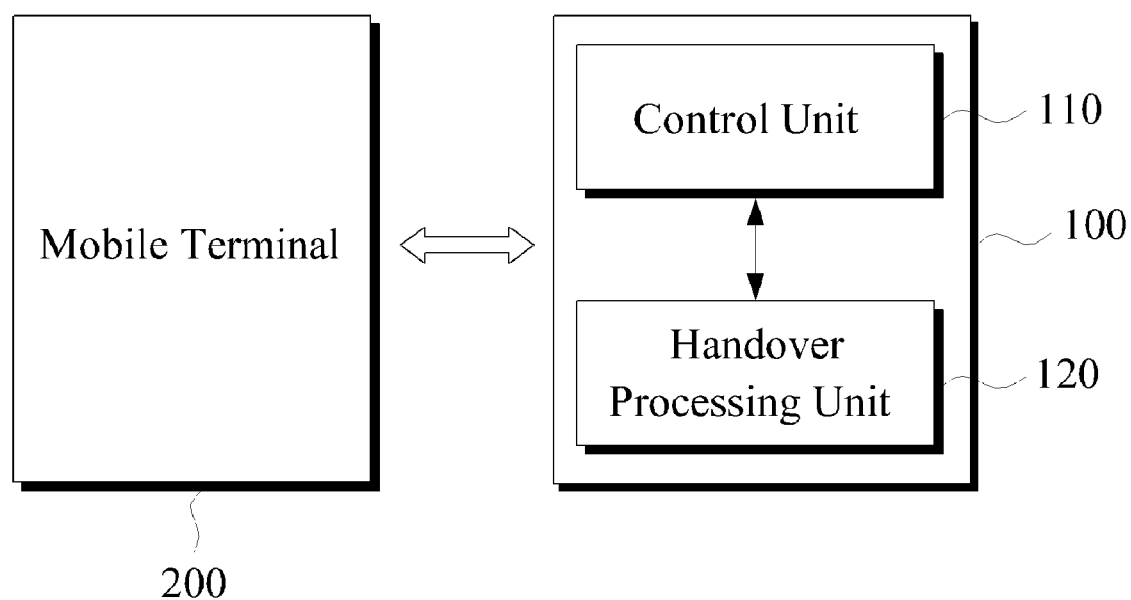
FIG. 2 is a block diagram of an inter-carrier member handover apparatus according to an exemplary embodiment.

FIG. 2 is a block diagram of an inter-carrier member handover apparatus 100 according to an exemplary embodiment.

Referring to FIG. 2, the inter-carrier member handover apparatus 100 is implemented as software, hardware, or a combination thereof loaded in a base station such as eNB in a third-generation long term evolution (3G LTE) system. The inter-carrier member handover apparatus 100 includes a control unit 110 and a handover processing unit 120.

The control unit 110 transmits or receives data by allocating a plurality of carriers to a single mobile terminal 200 and manages a carrier aggregation which includes a plurality of carrier members that process the allocated carriers.

When a handover is required between the carrier members in the carrier aggregation managed by the control unit 110, the handover processing unit 120 processes the handover.

Specifically, the handover processing unit 120 may request the mobile terminal 200 to measure the allocated carriers and may determine whether to perform a handover between the carrier members based on a measurement report received from the mobile terminal 200.

Here, the request for the measurement of the carriers may be a request for the measurement of the quality of carriers processed by all of the carrier members or the quality of a carrier processed by one of the carrier members. In addition, the request for quality measurement may be a request for the measurement of signal strength.

For example, the handover processing unit 120 may request the mobile terminal 200 to measure the signal strength of the carriers processed by all of the carrier members included in the carrier aggregation and may determine whether any one of carrier members currently being used by the mobile terminal 200 needs to be handed over based on the measured strength received from the mobile terminal 200.

When the measured strength of any one of carriers processed by the carrier members currently being used is less than a predetermined level, it may be determined that the corresponding carrier member needs to be handed over. In this case, a carrier member, which processes a carrier with sufficiently high signal strength, may be selected from carrier members currently being unused by the mobile terminal 200, and then the corresponding carrier member may be handed over to the selected carrier member. A specific handover process between carrier members will be described later.

When determining whether to perform a handover, the handover processing unit 120 may also refer to radio resource management information. That is, when it is determined that a handover is required and thus when a carrier member, which processes a carrier with sufficiently high signal strength, is selected from the carrier members currently being unused by the mobile terminal 200, the radio resource management information may also be used to select a carrier member having the best radio resources available as a target carrier member.

As described above, an intra-base station handover, which is simpler than a conventional inter-base station handover, can be performed when a mobile terminal and a base station exchange data using a plurality of carrier frequency bands.

Figure 3:
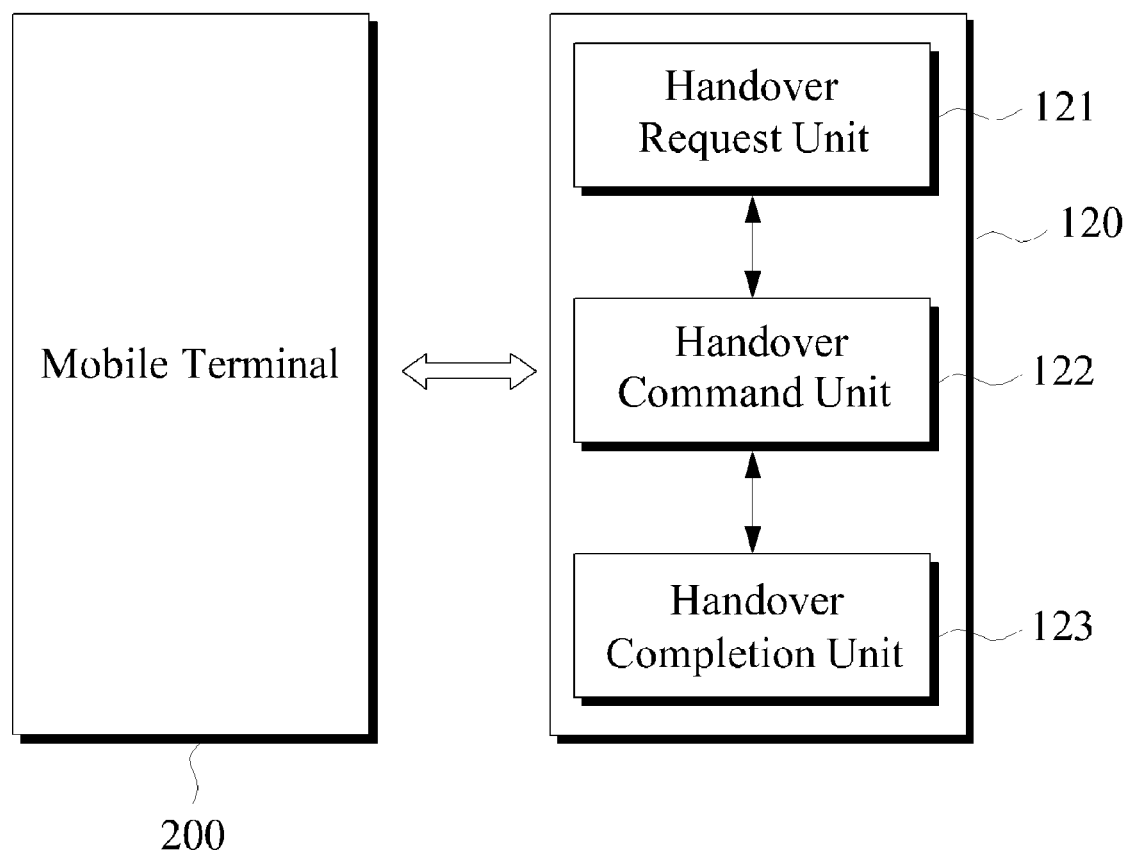
FIG. 3 is a block diagram of a handover processing unit included in the inter-carrier member handover apparatus of FIG. 2.

FIG. 3 is a block diagram of the handover processing unit 120 included in the inter-carrier member handover apparatus 100 of FIG. 2. Referring to FIG. 3, the handover processing unit 120 includes a handover request unit 121, a handover command unit 122, and a handover completion unit 123.

When it is determined that a handover will be performed, a source carrier member sends a handover request message to a target carrier member using the handover request unit 121. Here, the source carrier member may include its quality of service (QoS) information and physical layer (PHY) information in the handover request message and then send the handover request message to the target carrier member so that the target carrier member can set itself up for the handover using the QoS information and the PHY information.

Referring to FIG. 1, the active carrier member A and the source carrier member B are simultaneously connected between the base station and the mobile terminal. In this state, if it is determined that, for example, the source carrier member B will be handed over to the target carrier member D due to its poor radio environment, the source carrier member B sends a handover request message to the target carrier member D using the handover request unit 121.

Referring back to FIG. 3, when receiving a handover request acknowledgement message from the target carrier member, the source carrier member sends a handover command message to the mobile terminal 200 using the handover command unit 122.

The handover command message may include uplink (UL) allocation information and timing advance (TA) information needed for synchronization of the target carrier member and the mobile terminal 200.

After sending the handover command message, the handover command unit 122 may transfer a data processing operation performed by the source carrier member to an active carrier member, which is currently being synchronized with the mobile terminal 200, so that the data processing operation can be continuously performed.

Referring to FIG. 1, when receiving the handover request message from the source carrier member B, the target carrier member D prepares itself for the handover. Then, the target carrier member D sends a handover request acknowledgement message to the source carrier member B. When receiving the handover request acknowledgement message from the target carrier member D, the source carrier member B sends a handover command message to the mobile terminal using the handover command unit 122.

After the source carrier member B sends the handover command message, a data processing operation performed by the source carrier member B is transferred to the active carrier member A, which is currently being synchronized with the mobile terminal, so that the data processing operation can be continuously performed.

Referring back to FIG. 3, when the handover completion unit 123 receives a handover confirm message from the mobile terminal 200 which is synchronized with the target carrier member, it allows a data processing operation to be performed between the target carrier member and the mobile terminal 200.

Specifically, when receiving the handover confirm message from the mobile terminal 200, the handover completion unit 123 retransfers the data processing operation, which was transferred to the active carrier member, to the target carrier member so that the data processing operation can be performed between the target carrier member and the mobile terminal 200.

Referring to FIG. 1, when receiving the handover command message, the mobile terminal requests the target carrier member D to be synchronized therewith. As a result, the target carrier member D and the mobile terminal are synchronized with each other.

When the mobile terminal synchronized with the target carrier member D sends a handover confirm message to the target carrier member D, the data processing operation, which was transferred to the active carrier member A, is transferred again to the target carrier member D so that the data processing operation can be continuously performed between the target carrier member D and the mobile terminal.

As described above, an intra-base station handover, which is simpler than a conventional inter-base station handover, can be performed when a mobile terminal and a base station exchange data using a plurality of carrier frequency bands.

Figure 4:
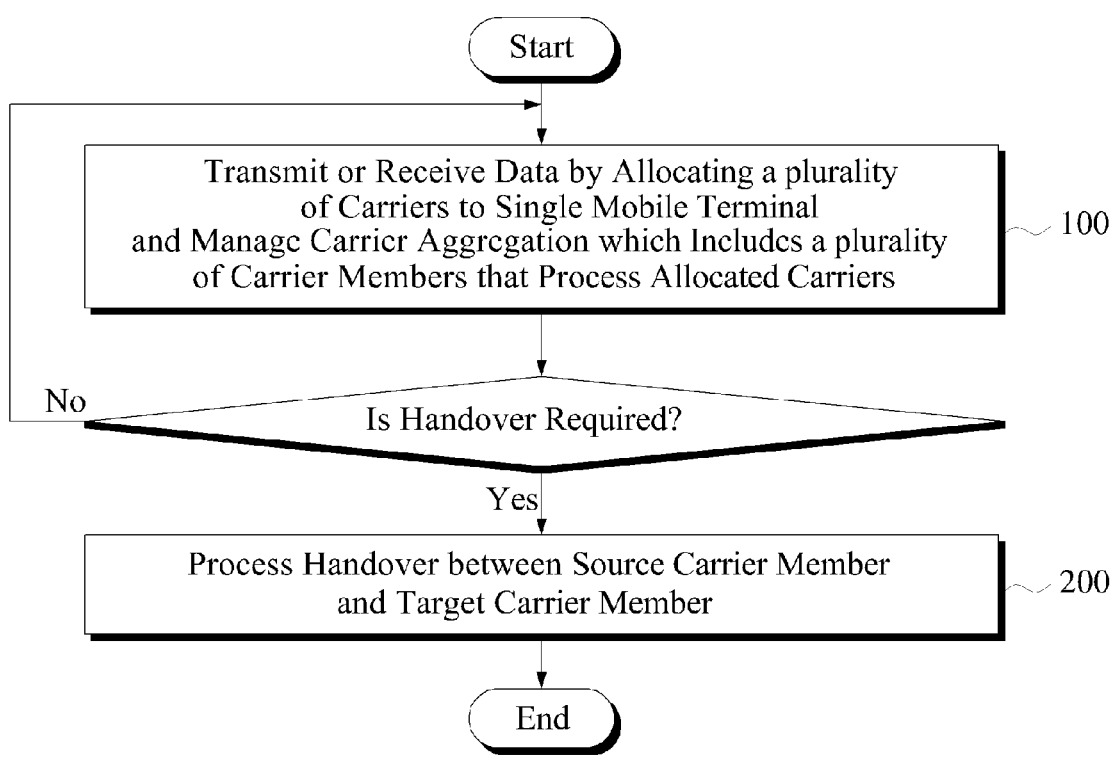
FIG. 4 is a flowchart illustrating an inter-carrier member handover method according to an exemplary embodiment.

Hereinafter, an inter-carrier member handover operation of the inter-carrier member handover apparatus 100 will be described with reference to FIGS. 4 through 6. FIG. 4 is a flowchart illustrating an inter-carrier member handover method according to an exemplary embodiment.

Referring to FIG. 4, the inter-carrier member handover apparatus 100 (see FIG. 2) transmits or receives data by allocating a plurality of carriers to a mobile terminal and manages a carrier aggregation which includes a plurality of carrier members that process the allocated carriers in operation 100.

When a handover is required between the carrier members in the carrier aggregation managed in operation 100, the inter-carrier member handover apparatus 100 processes a handover between a source carrier member and a target carrier member in operation 200.

Figure 5:
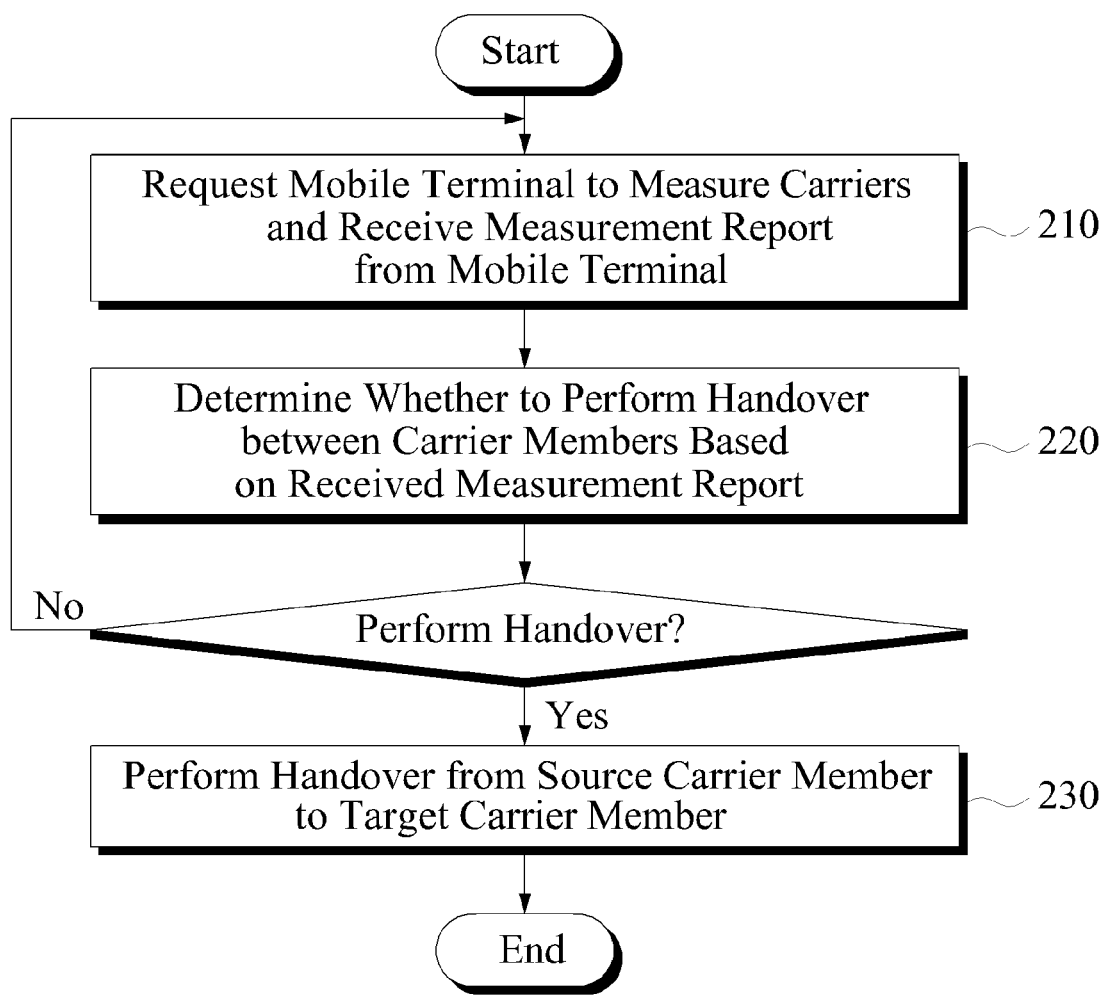
FIG. 5 is a flowchart illustrating operation 200 of FIG. 4 in detail.

Operation 200 includes operations illustrated in FIG. 5. FIG. 5 is a flowchart illustrating operation 200 of FIG. 4 in detail. Referring to FIG. 5, the inter-carrier member handover apparatus 100 requests a mobile terminal to measure carriers and receives a measurement report from the mobile terminal in operation 210.

In operation 210, the request for the measurement of the carriers may be a request for the measurement of the quality of carriers processed by all carrier members or the quality of a carrier processed by one of the carrier members. In addition, the request for quality measurement may be a request for the measurement of signal strength.

In operation 220, it is determined whether to perform a handover based on the measurement report received in operation 210. In operation 220, radio resource management information may also be used to determine whether to perform the handover. Determining whether to perform a handover has been described above, and thus a detailed description thereof will be omitted.

When it is determined in operation 220 that the handover will be performed, the inter-carrier member handover apparatus 100 performs a handover from the source carrier member to the target carrier member in operation 230.

Signal processing between the source carrier member and the target carrier member in operation 230 will now be described with reference to FIG. 6. FIG. 6 is a flowchart illustrating a signal processing operation for a handover.

Figure 6:
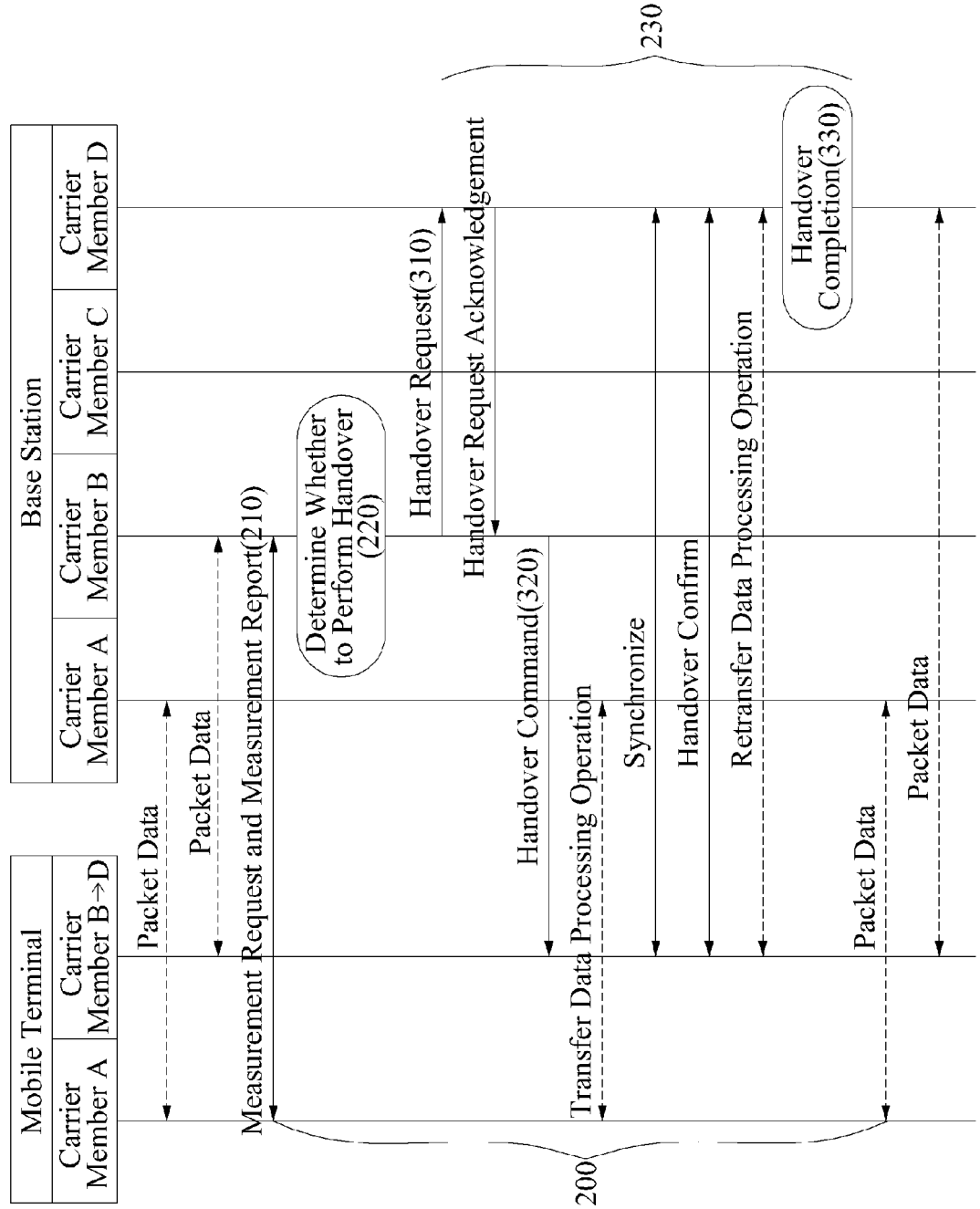
FIG. 6 is a flowchart illustrating a signal processing operation for a handover.

Referring to FIG. 6, a source carrier member sends a handover request message to a target carrier member in operation 310.

When the source carrier member receives a handover request acknowledgement message from the target carrier member, it sends a handover command message to a mobile terminal in operation 320.

After the source carrier member sends the handover command message to the mobile terminal in operation 320, a data processing operation performed by the source carrier member may be transferred to an active carrier member, which is currently being synchronized with the mobile terminal, so that the data processing operation can be continuously performed.

Next, the mobile terminal and the target carrier member communicate with each other to be synchronized with each other. When the target carrier member receives a handover confirm message from the mobile terminal synchronized therewith, the data processing operation is allowed to be performed between the target carrier member and the mobile terminal in operation 330.

Specifically, in operation 330, when the target carrier member receives the handover confirm message from the mobile terminal in operation 330, the data processing operation, which was transferred to the active carrier member, may be transferred again to the target carrier member so that the data processing operation can be performed between the target carrier member and the mobile terminal.

As described above, an intra-base station handover, which is simpler than a conventional inter-base station handover, can be performed when a mobile terminal and a base station exchange data using a plurality of carrier frequency bands.

The present invention can be industrially applied in the fields of mobile terminal handover technology and related technologies.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An inter-carrier member handover apparatus comprising:
   a control unit transmitting or receiving data by allocating a plurality of carriers to a single mobile terminal and managing a carrier aggregation which comprises a plurality of carrier members that process the allocated carriers; and
   a handover processing unit processing a handover between the carrier members in the carrier aggregation managed by the control unit when the handover is required,
   wherein after sending a handover command message, the handover processing unit transfers a data processing operation performed by a source carrier member to an active carrier member, which is currently being synchronized with the mobile terminal, so that the data processing operation can be continuously performed.

2. The handover apparatus of claim 1, wherein the handover processing unit requests the mobile terminal to measure the carriers and determines whether to perform a handover between the carrier members based on a measurement report received from the mobile terminal.

3. The handover apparatus of claim 2, wherein the request for the measurement of the carriers is a request for the measurement of quality of carriers processed by all of the carrier members.

4. The handover apparatus of claim 2, wherein the request for the measurement of the carriers is a request for the measurement of quality of a carrier processed by one of the carrier members.

5. The handover apparatus of claim 2, wherein the handover processing unit further refers to radio resource management information when determining whether to perform the handover.

6. The handover apparatus of claim 2, wherein the handover processing unit comprises:
   a handover request unit used by the source carrier member to send a handover request message to a target carrier member when the handover is determined to be performed;
   a handover command unit used by the source carrier member to send the handover command message to the mobile terminal when receiving a handover request acknowledgement message from the target carrier member; and
   a handover completion unit allowing the data processing operation to be performed between the target carrier member and the mobile terminal when receiving a handover confirm message from the mobile terminal which is synchronized with the target carrier member.

7. The handover apparatus of claim 1, wherein when receiving the handover confirm message, the handover completion unit transfers the data processing operation, which was transferred to the active carrier member, to the target carrier member so that the data processing operation can be continuously performed between the target carrier member and the mobile terminal.

8. An inter-carrier member handover method comprising:
transmitting or receiving data by allocating a plurality of carriers to a single mobile terminal and managing a carrier aggregation which comprises a plurality of carrier members that process the allocated carriers; and
processing a handover between the carrier members in the managed carrier aggregation when handover is required,
wherein after a handover command message is sent, a data processing operation performed by a source carrier member is transferred to an active carrier member, which is currently being synchronized with the mobile terminal, so that the data processing operation can be continuously performed.

* * * * *